US012640363B1

(12) United States Patent
Hondred et al.

(10) Patent No.: US 12,640,363 B1
(45) Date of Patent: May 26, 2026

(54) COATING PROCESS FOR SULFUR POLYMER CATHODES

(71) Applicant: Cornerstone Research Group, Inc., Miamisburg, OH (US)

(72) Inventors: John A. Hondred, Springboro, OH (US); Brian E. Henslee, Galloway, OH (US); Frank M. Zalar, Beavercreek, OH (US); Pavel Nikolaev, Beavercreek, OH (US)

(73) Assignee: Cornerstone Research Group, Inc., Miamisburg, OH (US)

( * ) Notice: Subject to any disclaimer, the term of this patent is extended or adjusted under 35 U.S.C. 154(b) by 0 days.

(21) Appl. No.: 18/657,987

(22) Filed: May 8, 2024

Related U.S. Application Data

(60) Provisional application No. 63/501,012, filed on May 9, 2023.

(51) Int. Cl.

| | |
|---|---|
| ***H01M 4/1399*** | (2010.01) |
| ***C08G 75/02*** | (2016.01) |
| ***H01M 4/04*** | (2006.01) |
| ***H01M 4/137*** | (2010.01) |
| ***H01M 4/60*** | (2006.01) |
| ***H01M 4/62*** | (2006.01) |
| ***H01M 4/66*** | (2006.01) |
| ***H01M 10/0565*** | (2010.01) |
| *H01M 4/02* | (2006.01) |

(52) U.S. Cl.

CPC .......... *H01M 4/1399* (2013.01); *C08G 75/02* (2013.01); *H01M 4/0404* (2013.01); *H01M 4/137* (2013.01); *H01M 4/602* (2013.01); *H01M 4/625* (2013.01); *H01M 4/661* (2013.01); *H01M 10/0565* (2013.01); *H01M 2004/028* (2013.01); *H01M 2300/0082* (2013.01)

(58) Field of Classification Search

CPC .. H01M 4/0404; H01M 4/137; H01M 4/1399; H01M 4/602; H01M 4/625; H01M 4/661; H01M 10/0565; H01M 2004/028; H01M 2300/0082

USPC .................................................... 427/58, 115

See application file for complete search history.

(56) References Cited

U.S. PATENT DOCUMENTS

| | | | | |
|---|---|---|---|---|
| 3,367,926 | A * | 2/1968 | Voeks | C08K 5/0008 524/169 |
| 5,792,575 | A * | 8/1998 | Naoi | H01M 4/60 429/104 |
| 6,869,729 | B1 * | 3/2005 | Pope | H01B 1/127 429/213 |
| 9,567,439 | B1 * | 2/2017 | Pyun | C08G 75/16 |
| 9,923,234 | B2 * | 3/2018 | Eitouni | H01M 10/052 |
| 10,811,728 | B2 * | 10/2020 | Desilani | H01M 10/052 |
| 10,985,365 | B2 * | 4/2021 | He | H01M 10/054 |
| 11,588,149 | B2 * | 2/2023 | Xu | C01B 32/348 |
| 11,605,817 | B2 * | 3/2023 | Tour | H01M 4/583 |
| 12,107,269 | B2 * | 10/2024 | Kim | H01M 4/13 |
| 2010/0227224 | A1 * | 9/2010 | Eitouni | H01M 4/382 429/304 |
| 2011/0206992 | A1 * | 8/2011 | Campbell | H01M 4/661 264/109 |
| 2014/0127589 | A1 * | 5/2014 | Wegner | H01M 4/1399 429/337 |
| 2014/0147738 | A1 * | 5/2014 | Chen | H01M 4/38 429/188 |
| 2014/0186522 | A1 * | 7/2014 | Woo | H01M 4/624 427/113 |
| 2014/0308198 | A1 * | 10/2014 | Falconieri | C04B 28/36 62/62 |
| 2016/0181600 | A1 * | 6/2016 | Omoda | H01M 4/625 429/212 |
| 2018/0208686 | A1 * | 7/2018 | Pyun | C08L 81/00 |
| 2020/0044253 | A1 * | 2/2020 | Chi | H01M 4/133 |
| 2020/0346196 | A1 * | 11/2020 | Zhou | C08G 75/02 |
| 2022/0359857 | A1 * | 11/2022 | Jang | H01M 10/0525 |
| 2023/0416511 | A1 * | 12/2023 | Alkhazraji | H01G 11/28 |
| 2024/0021779 | A1 * | 1/2024 | Cho | H01M 4/667 |

FOREIGN PATENT DOCUMENTS

| | | | | |
|---|---|---|---|---|
| WO | WO-2018202716 A1 * | 11/2018 | | H01M 4/622 |
| WO | WO-2022209595 A1 * | 10/2022 | | H01M 4/62 |

* cited by examiner

*Primary Examiner* — Brian K Talbot

(74) *Attorney, Agent, or Firm* — Dinsmore & Shohl LLP

(57) ABSTRACT

Processes for forming sulfur polymer cathodes include heating elemental sulfur above a melting point of sulfur to form molten sulfur having linear polysulfide chains, combining the molten sulfur with a cross-linker to form a sulfur polymer mixture, depositing a film of the sulfur polymer mixture on a substrate, and cooling the film of the sulfur polymer mixture to solidify the sulfur polymer mixture into a sulfur polymer. The cross-linker is a cyclic organic vinylic monomer comprising diene groups.

20 Claims, No Drawings

COATING PROCESS FOR SULFUR POLYMER CATHODES

CROSS-REFERENCE TO RELATED APPLICATIONS

This application claims priority to U.S. Provisional Application 63/501,012, filed May 9, 2023, which is incorporated by reference herein in its entirety.

STATEMENT REGARDING FEDERALLY SPONSORED RESEARCH OR DEVELOPMENT

This invention was made with U.S. Government support under Contract No. H9240522P0016 awarded by United States Special Operations Command (USSOCOM) and under Contract No. DE-SC0024050 awarded by the United States Department of Energy, both to Cornerstone Research Group Inc. The U.S. Government has certain rights in the invention.

TECHNICAL FIELD

Embodiments of the present disclosure relate to processes for forming sulfur polymer cathodes and more specifically processes for forming sulfur polymer cathodes utilizing hot-melt casting of a sulfur polymer onto a substrate.

BACKGROUND

Lithium-ion batteries often contain metals such as cobalt, nickel, and manganese, which are expensive and toxic and can contaminate water supplies and ecosystems if they leach out of landfills. Accordingly, efforts have begun to develop lithium-sulfur (Li—S) batteries which replace cobalt oxide with sulfur which is abundant and cheap. Further, lithium-sulfur batteries can have an improved safety compared to Li-ion batteries and don't require nickel, cobalt, or manganese in the cathode alleviating environmental concerns. However, transitioning Li—S chemistry from academic research to industry use has been limited and has presented challenges.

Li—S batteries are historically plagued by a variety of issues that inhibit their full operational potential. One of the most significant issues affecting Li—S batteries is the dissolution of sulfur in the cathode and migration of lithium polysulfides in organic liquid electrolyte. This phenomenon robs sulfur from participating in electrochemically mediated reactions, resulting in reduced sulfur utilization and capacity fading over time and with each cycling of the battery. Additionally, as sulfur is electrically insulating it is typically impregnated into carbon host materials when forming cathodes, which reduces the cathode active material loading. The high surface area of the carbon host material also results in high porosity, such as over 50%, and inevitably leads to a high electrolyte to active material ratio, effectively decreasing the energy density of the cell. Finally, conventional wet film coating techniques struggle to coat cathodes with high material loadings due to a mud cracking phenomenon and flaking off the current collector typically achieving less than 5 mg/cm$^2$.

SUMMARY

As such, there is an ongoing need for improved Li—S batteries and more particularly improved processes for forming sulfur polymer cathodes for inclusion in Li—S battery cells. The present disclosure addresses these needs by providing a process for forming cathodes for Li—S batteries based on inverse vulcanization to generate a sulfur polymer for sulfur polymer cathodes.

Embodiments of the present disclosure relate to processes for forming sulfur polymer cathodes. The processes include heating elemental sulfur above the melting point of sulfur to form molten sulfur comprising linear polysulfide chains; combining the molten sulfur with a cross-linker to form a sulfur polymer mixture, the cross-linker being organic vinylic monomer comprising diene groups; depositing a film of the sulfur polymer mixture on a substrate; and cooling the film of the sulfur polymer mixture to solidify the sulfur polymer mixture into a sulfur polymer.

DETAILED DESCRIPTION

Embodiments of the present disclosure generally relate to processes for forming sulfur polymer cathodes utilizing hot-melt casting of a sulfur polymer onto a substrate.

In accordance with embodiments of the process for forming sulfur polymer cathodes, the process comprises a series of steps. The process initially comprises heating elemental sulfur above the melting point of sulfur to form molten sulfur comprising linear polysulfide chains. The process further comprises combining the molten sulfur with a cross-linker to form a sulfur polymer mixture, the cross-linker being an organic vinylic monomer comprising diene groups. A conductive carbon additive may also be combined with the sulfur polymer mixture along with binders and/or solid electrolytes. Finally, the process comprises depositing a film of the sulfur polymer mixture on a substrate and cooling the film of the sulfur polymer mixture to solidify the sulfur polymer mixture into a sulfur polymer.

In accordance with various embodiments, the present disclosure provides new manufacturing processes for coating sulfur polymer cathodes. Such process may be referred to as "hot-melt casting" throughout the present disclosure for conciseness. During an inverse vulcanization process, molten sulfur is polymerized which prevents it from crystalizing when it cools. Directly after polymerizing the sulfur, when it is still it its molten state, carbon and binders can be added, thoroughly mixed, and then cast onto aluminum foil or other substrate. Such process allows for tailoring of the melting point and glass transition temperature of the sulfur polymer by varying the concentration of crosslinker and the polymerization reaction time. This control of the cathode active material provides unique opportunities for coating the sulfur polymer in its molten state, which are not possible for other cathode active materials such as metal oxides. This reduces, and in certain embodiments eliminates, the need for solvents and consequently may accelerate the manufacturing process as no drying of the formed cathode is needed and instead just cooling of the cathode.

Having generally described process for forming sulfur polymer cathodes, the specific steps and components will now be described in further detail.

The formation of sulfur polymers in accordance with the present disclosure utilizes an inverse vulcanization process. Inverse vulcanization is a process that produces polysulfide polymers, which also contain some organic linkers. In contrast, sulfur vulcanization produces material that is predominantly organic but has a small percentage of polysulfide crosslinks. Specifically, polymers produced by inverse vulcanization consist of long sulfur linear chains interspersed with organic linkers. Traditional sulfur vulcanization produces a cross-linked material with short sulfur bridges, down to one or two sulfur atoms.

The process of inverse vulcanization includes heating elemental sulfur above a melting point of sulfur to form molten sulfur comprising linear polysulfide chains. Specifically, heating elemental sulfur to a temperature in excess of the melting point of sulfur results initiates ring opening of the sulfur, typically structured as an $S_8$ ring. In one or more embodiments, the elemental sulfur is heated to at least 113° C. In accordance with various further embodiments, the elemental sulfur is heated to at least 129° C., at least 139° C., at least 149° C., or at least 159° C.

The molten sulfur generated from heating the elemental sulfur to a temperature above its melting point is then with a cross-linker to form a sulfur polymer mixture. Specifically, the cross-linker combines with the sulfur to generate a sulfur-based polymer. The cross-linker is typically an organic vinylic monomer comprising diene groups. An example formation of the sulfur polymer from the combination of the melted elemental sulfur and cross-linker is illustrated by Reaction 1 presented infra.

Reaction 1

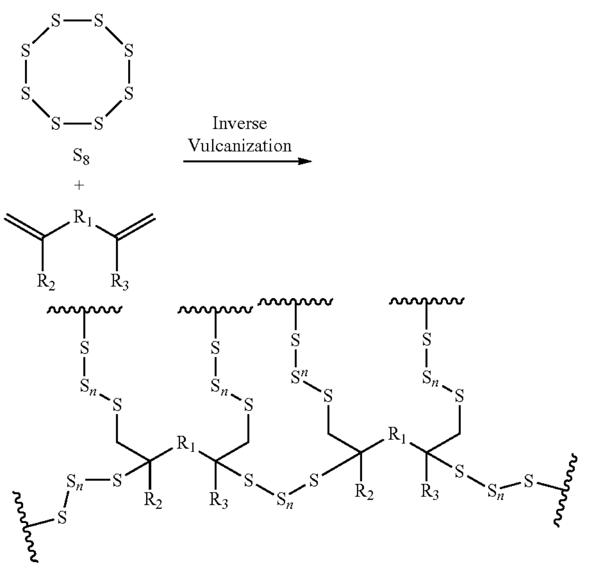

In one or more embodiments, the cross-linker is provided at 5 to 30 weight percent (wt %) of the sulfur polymer cathode. Specifically, the cross-linker is combined with the molten sulfur such that the formed sulfur polymer mixture comprises 5 to 30 wt % of the cross-linker. In various further embodiments, the cross-linker is provided at 5 to 25 wt % of the sulfur polymer cathode, 5 to 20 wt % of the sulfur polymer cathode, 5 to 15 wt % of the sulfur polymer cathode, or 5 to 10 wt % of the sulfur polymer cathode.

The organic vinylic monomer crosslinkers and their corresponding heteroatoms chemically anchor the sulfur and resulting polysulfides in the polymer network. A variety of vinylic crosslinkers are able to effectively polymerize sulfur through inverse vulcanization. The resulting sulfur polymers can have different physical, chemical, and electrochemical characteristic, of which, some may be more beneficial than others for utilization in lithium ion battery cells.

The cross-linker may be provided in various formats. In accordance with various embodiments, the cross-linker may be vinylphosphonic acid (VPA), diallyl disulfide (DADS), myrcene, squalene, or isoprene. In one or more embodiments, the cross-linker is a cyclic hydrocarbon. In accordance with various embodiments, the cross-linker comprises dicyclopentadiene (DCPD), 1,3 diisopropenylbenzene, limonene, styryl ethyltrimethoxysilane, pyrolle, and/or 5-ethylidene-2-norbornene.

When dicyclopentadiene (DCPD) is utilized as the cross-linker a variety of different sulfur-based polymers may be generated with Reactions 2 and 3 being examples.

Reaction 2

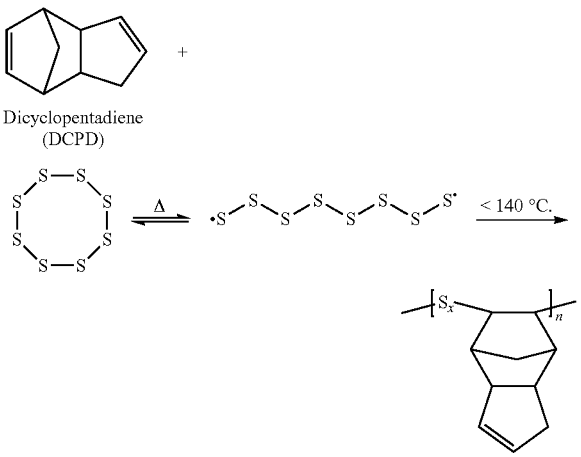

Dicyclopentadiene (DCPD)

Reaction 3

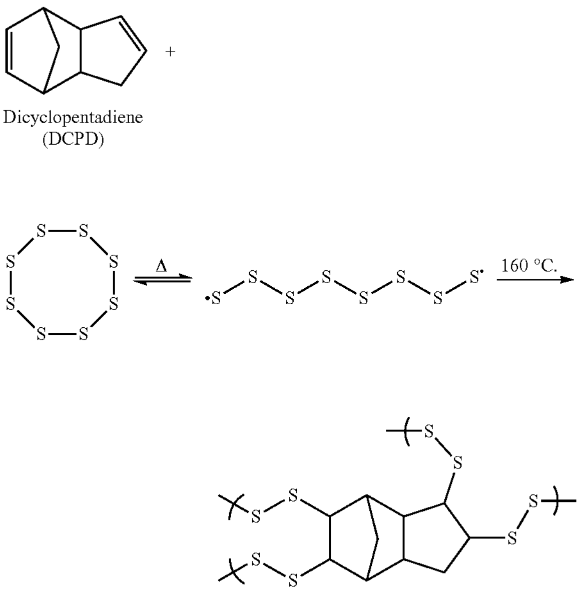

Dicyclopentadiene (DCPD)

When vinylphosphonic acid (VPA) is utilized as the cross-linker a variety of different sulfur-based polymers may be generated with those of Reaction 4 being examples. Further, the VPA polymer utilizes hetero-atom function groups which creates intermolecular attraction between the polymer and polysulfides which aids in reducing shuttle effect.

Reaction 4

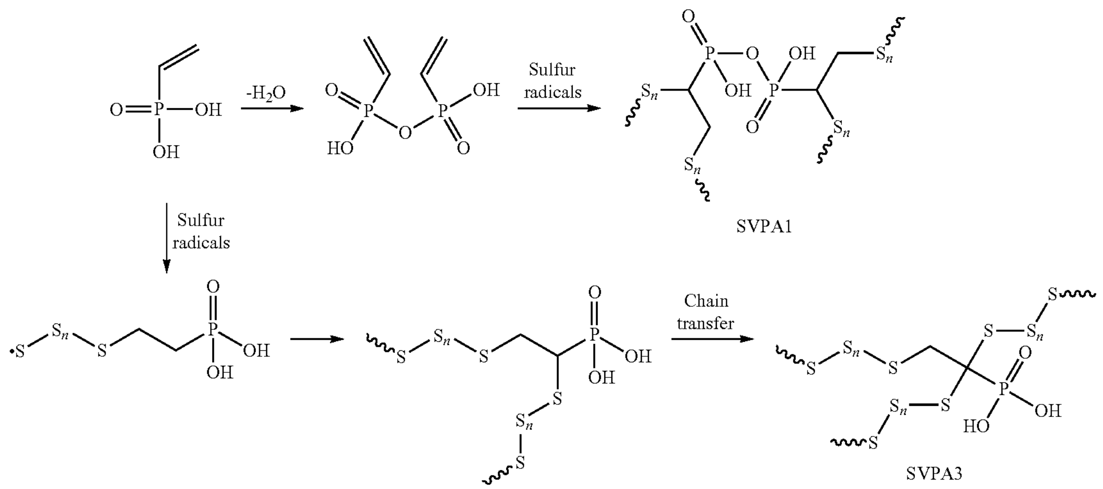

SVPA1

SVPA2

SVPA3

When pyrroles are utilized as the cross-linker a variety of different sulfur-based polymers which are polypyrrole polymer may be generated, with Reaction 5 provided as an example. Further, the polypyrrole polymer includes a polymer back-bone which prevents degradation of the polymer.

Reaction 5

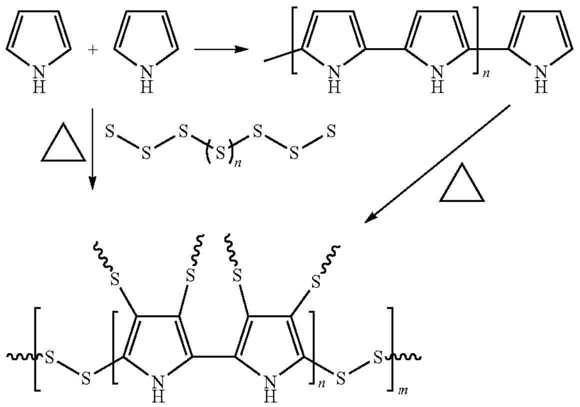

It is desirable to produce polymers which had been fully reacted, as full consumption of the sulfur stops the generation of loose crystalline domains of sulfur. In one or more embodiments, the sulfur polymer is heated to 160° C. in an oven, for example, to fully react the reagents to produce solid, homogenous polymers without noticeable crystalline sulfur domains.

To effectively operate in a Li—S battery cell, the cathode active material should not be soluble in the electrolyte utilized in the Li—S battery. If the active material becomes soluble, it can migrate to the anode and directly react with the lithium metal generating an effect similar to polysulfide shuttling. Without wishing to be bound by theory, it is believed that solubility in the electrolyte may be affected based on the molecular shape and number of binding locations of the crosslinkers. For example, short linear hydrocarbon chains may not fully crosslink the polymer, but develop a hyper-branched structure which tends to more easily dissolved in electrolytes. In contrast, cyclic hydrocarbon has several binding locations which form more of a fully crosslinked network. This crosslinked network increases the sulfur polymers stability in organic solvents.

Sulfur has an extremely high theoretical specific capacity of 1675 mAh/g rendering it desirable for inclusion in cathodes, but dilution of sulfur reduces such theoretical specific capacity. Polymerized sulfur in accordance with the present disclosure removes the need to physically confine sulfur in carbon. Instead the organic crosslinkers and their corresponding heteroatoms chemically anchor the sulfur and resulting polysulfides in the polymer network. Moreover, the properties of the sulfur polymer including electrical and ionic conductivity, band gap, solubility, melting and glass transition temperature can be tuned via the inverse vulcanization process and the particular crosslinker used.

Polymerization of sulfur provides a unique opportunity for casting the cathode as a "hot-melt", instead of a conventional slurry. Accordingly, after polymerizing the sulfur to form the sulfur polymer mixture and while still hot and in a molten state, a film of the sulfur polymer mixture is coated on a substrate. Subsequently, the film of the sulfur polymer mixture is cooled to solidify the sulfur polymer mixture into a sulfur polymer forming the sulfur polymer cathode. It is noted that the substrate serves as the current collector for the cathode. In various embodiments, the film of the sulfur polymer mixture has a thickness of 10 to 50 μm, 10 to 40 μm, 15 to 40 μm, 15 to 35 μm, or 15 to 25 μm In one or more embodiments, the substrate upon which the sulfur polymer mixture is deposited to form the film is an aluminum foil. In various further embodiments, the substrate may be carbon, titanium, or stainless steel.

In one or more embodiments, the sulfur polymer mixture is infused into high surface area carbons. Such encapsulation provides electrical conductivity and helps retain polysulfides.

In one or more embodiments, conductive carbon additive is combined with the sulfur polymer mixture prior to depositing the sulfur polymer mixture on the substrate. Specifically, in addition to the crosslinker being added to the molten sulfur, conductive carbon may be added. Direct addition of the conductive carbon to the molten sulfur polymer provides more intimate contact with the active material. After the crosslinker is added and becomes miscible with the molten sulfur during the inverse vulcanization process, conductive carbons may be added at the desired ratio. In various embodiments, the conductive carbon may be any conductive carbon additive known to one skilled in the art. It is noted that it does not appear that these carbon additives effect the polymerization process, but improves the electrical conductivity of the resulting polymer.

In one or more embodiments, the conductive carbon additive comprises a high surface area carbon. A high surface area carbon, in accordance with various embodiments, may comprise a surface area of greater than 25 $m^2/g$, greater than 30 $m^2/g$, greater than 50 $m^2/g$, or greater than 250 $m^2/g$. For example, the conductive carbon additive may comprise carbon black, ketjen black, carbon nanotubes, and/or graphene.

In one or more embodiments, the conductive carbon additives comprising a high surface area carbon may be combined with the sulfur polymer mixture at up to 15 wt %. For example, in various embodiments, the conductive carbon additives comprising a high surface area carbon may be combined with the sulfur polymer mixture at 1 to 15 wt. %, 1 to 10 wt. %, 1 to 5 wt. %, 3 to 15 wt. %, 3 to 10 wt. %, or 3 to 8 wt. %.

In one or more embodiments, the conductive carbon additive comprises a low surface area carbon. A low surface area carbon, in accordance with various embodiments, may comprise a surface area of greater less 5 $m^2/g$, less than 10 $m^2/g$, less than 15 $m^2/g$, or less than 25 $m^2/g$. For example, the conductive carbon additive may comprise graphite.

In one or more embodiments, the conductive carbon additives comprising a low surface area carbon may be combined with the sulfur polymer mixture at up to 30 wt %. For example, in various embodiments, the conductive carbon additives comprising a low surface area carbon may be combined with the sulfur polymer mixture at 1 to 30 wt. %, 1 to 20 wt. %, 1 to 10 wt. %, 3 to 30 wt. %, 3 to 20 wt. %, or 5 to 15 wt. %.

In one or more embodiments, the conductive carbon additive comprises a combination of a low surface area carbon comprising a surface area of less than 25 $m^2/g$ and a high surface area carbon comprising a surface area of greater than 25 $m^2/g$. Specifically, in various embodiments, the conductive carbon additive may be combined at a ratio of high surface area carbon to low surface area carbon of 1:0 to 0:1, 1:100 to 100:1, 1:25 to 25:1, 1:10 to 10:1, 1:2 to 2:1, 1:0 to 1:1, 1:1 to 1:0, 1:1 to 25:1, 1:1 to 10:1, 1:1 to 5:1, 25:1 to 1:1, 10:1 to 1:1, or 5:1 to 1:1.

Addition of conductive carbon additives increases the viscosity of the molten sulfur. It is noted that high surface area carbon increases the viscosity of the molten sulfur to a greater degree than low surface area carbon. Accordingly, it is noted that the preferred maximal inclusion of high surface area carbon is less than the preferred maximal inclusion of low surface area carbon in the sulfur polymer mixture. Additionally, addition of the conductive carbon reduces the overall energy density of the resulting cathode as the conductive carbon increases volume and mass while not being actively electrochemically reactive.

In one or more embodiments, selenium is melted and combined with the elemental sulfur prior to combining the molten sulfur with the cross-linker. It is noted that, selenium which is a chalcogen similar to sulfur, can be added to the polymer to increase its electrical conductivity. During the inverse vulcanization process, selenium can be added to sulfur and melted along with the sulfur before crosslinking. The selenium forms a homogeneous melted mixture with the sulfur, darkening its color and increasing its viscosity. The selenium sulfur mixture then may be crosslinked via inverse vulcanization forming a polymer network.

In one or more embodiments, the selenium and elemental sulfur are provided at a 0:1 to 1:0 ratio by weight. In various further embodiments, the selenium and elemental sulfur are provided at a 1:15 to 1:5 ratio by weight, at a 1:10 to 1:5 ratio by weight, at a 1:20 to 1:8 ratio by weight, or at a 1:12 to 1:8 ratio by weight. It is noted that selenium may replace sulfur, but has a lower specific capacity. Specifically, selenium has a specific capacity of 675 mAh/g instead of 1675 mAh/g for sulfur.

In various embodiments, the sulfur polymer may be doped with different types of additives to improve its physical, chemical, and electrochemical characteristics. As previously discussed, conductive carbon additive and/or selenium may be added. In various embodiments, sodium diethyldithiocarbamate trihydrate, diethyldithiocarbamate derivatives, titanium oxide, and/or ZnO may additionally or alternatively be added to the sulfur polymer.

Porosity within cathodes may be beneficial for allowing electrolyte to infiltrate into the cathode and provide ionic channels for lithium ions. However, hot-melt casting the sulfur polymer alone may lead to a dense cathode with limited porosity. As such, at high loadings, charge and discharge kinetics may be limited to the surface. Therefore, while not required, the present disclosure additionally provides a variety of methods for increasing the ionic conductivity of the cathode. It will be appreciated that the manufacturing process may be performed without porosity adding measurements, but inclusion of such porosity adding measures represent additional benefits. Specifically, adding porosity allows the electrolyte to infiltrate the electrode providing enhanced performance.

In one or more embodiments, a solvent is added to the sulfur polymer mixture prior to depositing a film of the sulfur polymer mixture on the substrate. After cooling, the solvent may be removed from the sulfur polymer to generate porosity within the sulfur polymer cathode. Accordingly, in one or more embodiments, toluene may be added to the polymer mixture to generate porosity in the generated sulfur polymer cathode. In various embodiments, the solvent may comprise toluene, xylene, naphthalene, dialkyl disulfides, quinolone, and/or dichlorobenzene. The solvent may be removed through natural evaporation or rapidly removed by phase inversion.

Having indicated that a solvent may added to the sulfur polymer mixture prior to depositing a film of the sulfur polymer mixture on the substrate, it is expressly note that in one or more embodiments no solvent is added to the sulfur polymer mixture prior to depositing a film of the sulfur polymer mixture on the substrate.

In one or more embodiments, a sacrificial co-polymer is added to the sulfur polymer mixture prior to depositing a film of the sulfur polymer mixture on the substrate. After cooling, the sacrificial co-polymer may be removed from the sulfur polymer to generate porosity within the sulfur polymer cathode. Specifically, the sacrificial co-polymer may be blended into the molten sulfur to create a blended polymer such that when the co-polymer is removed, it leaves a porous network. Accordingly, in one or more embodiments, polyethylene glycol (PEG) may be added to the molten sulfur as a sacrificial co-polymer to generate porosity in the generated sulfur polymer cathode. The sacrificial co-polymer, in accordance with various embodiments, may be provided as 5 to 30% of the sulfur polymer mixture, 5 to 20% of the sulfur polymer mixture, 10 to 20% of the sulfur polymer mixture, or 15 to 30% of the sulfur polymer mixture.

Embodiments of the present disclosure also include avenues to introduce porosity to the cathode without utilization of solvents or sacrificial co-polymers. Specifically, according to one or more embodiments, the sulfur polymer may be tailored to swell, thereby absorbing electrolyte into its polymer network. The swelling with electrolyte creates ionic channels throughout the sulfur polymer cathode. The level of swelling is based on the amount of crosslinking and the chemical stability of the resulting polymer. Typically, but without wishing to be bound by theory, hyperbranched polymers absorb more electrolyte and swell to a greater degree while fully crosslinked polymers swell to a lesser degree at the benefit of a reduced tendency to dissolve in the electrolyte.

In one or more embodiments, a solid polymer electrolyte is added to the sulfur polymer mixture prior to depositing the film of the sulfur polymer mixture on the substrate. The solid polymer electrolyte may be utilized to provide close connection between the electrolyte and sulfur polymer. Specifically, during the hot-melt casting of the sulfur polymer, solid polymer electrolytes may be thoroughly mixed together with the molten sulfur prior to casting to incorporate the solid polymer electrolyte throughout the film of the sulfur polymer mixture. A solid polymer electrolyte, which is miscible with the sulfur polymer, provides intimate and nanoscale contact simultaneously between the electrolyte, sulfur active material, and electrically conductive carbons if present.

In various embodiments, the solid polymer electrolyte may be one or more of POSS/PEG/methyl cellulose, HPG-PPEGMA, Oligo (ethyleneoxy)cyclotriphosphazenes, Poly (oxctane)-polyDDOE, PVA, P(EO/MEEGFE), PMPEA, P(EO/PO), TEC, PEP, P(EO/MEEGE/AGE), PME-GE, PEO-PEGEEM-MMA, Siloxy-aluminate polymer, PLMA-b-POEM, Cyanuric chloride/PEO, PEG-PDMS, and PEO. The solid polymer electrolyte, in accordance with various embodiments, may be provided as 5 to 30% of the sulfur polymer mixture, 5 to 20% of the sulfur polymer mixture, 10 to 20% of the sulfur polymer mixture, or 15 to 30% of the sulfur polymer mixture.

In order that the previously described embodiments may be more easily understood, reference is made to the following examples that illustrate one or more features of the present disclosure. The examples are in no way intended to be limiting in scope.

Examples

Solubility testing of various sulfur based polymers in an exemplary electrolyte was undertaken to confirm the stability of the sulfur polymer cathodes in accordance with the present disclosure. Specifically, a control sample of pure elemental sulfur was prepared to provide a baseline solubility in the exemplary electrolyte. Comparative Samples were prepared using short linear chain hydrocarbons as the cross-linker. Specifically, Comparative Sample 1 was prepared using Myrcene ($C_{10}H_{16}$) as the cross-linker and Comparative Sample 2 was prepared using Farnesene ($C_{15}H_{24}$) as the cross-linker. Inventive Samples were also prepared using cyclic hydrocarbons in accordance with the present disclosure. Specifically, Inventive Sample 3 was prepared using dicyclopentadiene as the cross-linker and Inventive Sample 4 was prepared using 1,3 diisopropenylbenzene as the cross-linker.

Each of the control sample, Comparative Sample 1, Comparative Sample 2, Inventive Sample 3, and Inventive Sample 4 were placed into the exemplary electrolyte formed from 1,2-Dimethoxyethane (DME) and 1,3-Dioxolane (DOL) for 1 week at an elevated temperature. At the conclusion of the week of soak in the exemplary electrolyte, the color of the electrolyte was reviewed to determine the dissolution of the sulfur polymer and solubility in the electrolyte. The control sample of pure sulfur which forms an octal crystal structure is extremely insoluble in most organic solvents and showed no color change. Conversely, Comparative Samples 1 and 2 almost completely dissolved into the exemplary electrolyte. The Inventive Samples 3 and 4 demonstrated little solubility in the electrolyte of DOL/DME and had only a slight change in color.

A sulfur polymer cathode was also cast in accordance with the present disclosure to demonstrate feasibility. Specifically, a sulfur polymer mixture in accordance with the present disclosure was prepare and cast onto an aluminum foil substrate. The sulfur polymer mixture was formulated with 85 wt % total sulfur, 5 wt % crosslinker, and 10 wt % conductive carbon additives. The 5 wt % crosslinker was dicyclopentadiene (DCPD) and the 10 wt % conductive carbon additive comprises graphite, carbon black, and multiwalled-carbon-nantotubes at a 2:1:1 ratio. The sulfur polymer cathode was cast at 100° C. which is noted to be below the melting temperature of pure sulfur. The resulting sulfur polymer cathode was observed to be extremely uniform without signs of recrystallization of the sulfur indicating desirable preparation of the sulfur polymer cathode.

Having described various embodiments, it should be understood that the various aspects of the process for forming sulfur polymer cathodes may be utilized in conjunction with various other aspects.

In a first aspect, the disclosure provides a process for forming sulfur polymer cathodes. The process comprises heating elemental sulfur above a melting point of sulfur to form molten sulfur comprising linear polysulfide chains; combining the molten sulfur with a cross-linker to form a sulfur polymer mixture, the cross-linker being a cyclic organic vinylic monomer comprising diene groups; depositing a film of the sulfur polymer mixture on a substrate; and cooling the film of the sulfur polymer mixture to solidify the sulfur polymer mixture into a sulfur polymer.

In a second aspect, the disclosure provides the process of the first aspect, in which the elemental sulfur is heated to at least 113° C.

In a third aspect, the disclosure provides the process of the first aspect, in which the elemental sulfur is heated to at least 159° C.

In a fourth aspect, the disclosure provides the process of any of the first through third aspects, in which the cross-linker is provided at 5 to 30 wt % of the sulfur polymer cathode.

In a fifth aspect, the disclosure provides the process of any of the first through fourth aspects, in which the cross-linker comprises dicyclopentadiene.

In a sixth aspect, the disclosure provides the process of any of the first through fifth aspects, in which the cross-linker comprises 1,3 diisopropenylbenzene.

In a seventh aspect, the disclosure provides the process of any of the first through sixth aspects, in which a conductive carbon additive is combined with the sulfur polymer mixture prior to depositing the sulfur polymer mixture on the substrate.

In an eighth aspect, the disclosure provides the process of the seventh aspect, in which the conductive carbon additive comprises a high surface area carbon comprising a surface area of greater than 25 $m^2/g$.

In a ninth aspect, the disclosure provides the process of the seventh or eighth aspect, in which the conductive carbon additive comprises carbon black, ketjen black, carbon nanotubes, graphene, or their combinations.

In a tenth aspect, the disclosure provides the process of any of the seventh through ninth aspects, in which the conductive carbon additive is combined with the sulfur polymer mixture at up to 15 wt %.

In an eleventh aspect, the disclosure provides the process of any of the seventh through tenth aspects, in which the conductive carbon additive comprises a low surface area carbon comprising a surface area of less than 25 $m^2/g$.

In a twelfth aspect, the disclosure provides the process of any of the seventh through eleventh aspects, in which the conductive carbon additive comprises graphite.

In a thirteenth aspect, the disclosure provides the process of any of the seventh through twelfth aspects, in which the conductive carbon additive is combined with the sulfur polymer mixture at up to 30 wt %.

In a fourteenth aspect, the disclosure provides the process of any of the seventh through thirteenth aspects, in which the conductive carbon additive comprises a combination of a low surface area carbon comprising a surface area of less than 25 $m^2/g$ and a high surface area carbon comprising a surface area of greater than 25 $m^2/g$.

In a fifteenth aspect, the disclosure provides the process of any of the first through fourteenth aspects, in which selenium is melted and combined with the elemental sulfur prior to combining the molten sulfur with the cross-linker.

In a sixteenth aspect, the disclosure provides the process of the fifteenth aspect, in which the selenium and elemental sulfur are provided at a 1:20 to 1:5 ratio by weight.

In a seventeenth aspect, the disclosure provides the process of any of the first through sixteenth aspects, in which the substrate is an aluminum foil.

In an eighteenth aspect, the disclosure provides the process of any of the first through seventeenth aspects, in which no solvent is added to the sulfur polymer mixture prior to depositing a film of the sulfur polymer mixture on the substrate.

In a nineteenth aspect, the disclosure provides the process of any of the first through seventeenth aspects, in which a solvent is added to the sulfur polymer mixture prior to depositing a film of the sulfur polymer mixture on the substrate and the process further comprises removing the solvent from the sulfur polymer after cooling to generate porosity within the sulfur polymer cathode.

In a twentieth aspect, the disclosure provides the process of any of the first through nineteenth aspects, in which a sacrificial co-polymer is added to the sulfur polymer mixture prior to depositing a film of the sulfur polymer mixture on the substrate and the process further comprises removing the sacrificial co-polymer from the sulfur polymer after cooling to generate porosity within the sulfur polymer cathode.

In a twenty-first aspect, the disclosure provides the process of the twentieth aspect, in which the sacrificial copolymer is polyethylene glycol.

In a twenty-second aspect, the disclosure provides the process of any of the first through twenty-first aspects, in which a solid polymer electrolyte is added to the sulfur polymer mixture prior to depositing the film of the sulfur polymer mixture on the substrate.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

As used throughout, the singular forms “a,” “an” and “the” include plural referents unless the context clearly dictates otherwise. Thus, for example, reference to “a” component includes aspects having two or more such components, unless the context clearly indicates otherwise.

It should be understood that any two quantitative values assigned to a property or measurement may constitute a range of that property or measurement, and all combinations of ranges formed from all stated quantitative values of a given property or measurement are contemplated in this disclosure.

As used here and in the appended claims, the words “comprise,” “has,” and “include” and all grammatical variations thereof are each intended to have an open, non-limiting meaning that does not exclude additional elements or steps.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A process for forming sulfur polymer cathodes, the process comprising:

heating elemental sulfur above a melting point of sulfur to form molten sulfur comprising linear polysulfide chains;

combining the molten sulfur with a cross-linker to form a sulfur polymer mixture, the cross-linker being a cyclic organic vinylic monomer comprising diene groups;

depositing a film of the sulfur polymer mixture on a substrate; and cooling the film of the sulfur polymer mixture to solidify the sulfur polymer mixture into a sulfur polymer without sulfur crystallization.

2. The process of claim 1 in which the elemental sulfur is heated to at least 113° C.

3. The process of claim 1 in which the elemental sulfur is heated to at least 159° C.

4. The process of claim 1 in which the cross-linker is provided at 5 to 30 wt % of the sulfur polymer cathode.

5. The process of claim 1 in which the cross-linker comprises dicyclopentadiene.

6. The process of claim 1 in which the cross-linker comprises 1,3 diisopropenylbenzene.

7. The process of claim 1 in which a conductive carbon additive is combined with the sulfur polymer mixture prior to depositing the sulfur polymer mixture on the substrate.

8. The process of claim 7 in which the conductive carbon additive comprises a high surface area carbon comprising a surface area of greater than 25 $m^2/g$.

9. The process of claim 8 in which the conductive carbon additive is combined with the sulfur polymer mixture at up to 15 wt %.

10. The process of claim 7 in which the conductive carbon additive comprises a low surface area carbon comprising a surface area of less than 25 $m^2/g$.

11. The process of claim 10 in which the conductive carbon additive is combined with the sulfur polymer mixture at up to 30 wt %.

12. The process of claim 7 in which the conductive carbon additive comprises a combination of a low surface area carbon comprising a surface area of less than 25 $m^2/g$ and a high surface area carbon comprising a surface area of greater than 25 $m^2/g$.

13. The process of claim 1 in which selenium is melted and combined with the elemental sulfur prior to combining the molten sulfur with the cross-linker.

14. The process of claim 13 in which the selenium and elemental sulfur are provided at a 1:20 to 1:5 ratio by weight.

15. The process of claim 1 in which the substrate is an aluminum foil.

16. The process of claim 1 in which no solvent is added to the sulfur polymer mixture prior to depositing a film of the sulfur polymer mixture on the substrate.

17. The process of claim 1 in which a solvent is added to the sulfur polymer mixture prior to depositing a film of the sulfur polymer mixture on the substrate; and the process further comprises removing the solvent from the sulfur polymer after cooling to generate porosity within the sulfur polymer cathode.

18. The process of claim 1 in which a sacrificial co-polymer is added to the sulfur polymer mixture prior to depositing a film of the sulfur polymer mixture on the substrate; and the process further comprises removing the sacrificial co-polymer from the sulfur polymer after cooling to generate porosity within the sulfur polymer cathode.

19. The process of claim 18 in which the sacrificial co-polymer is polyethylene glycol.

20. The process of claim 1 in which a solid polymer electrolyte is added to the sulfur polymer mixture prior to depositing the film of the sulfur polymer mixture on the substrate.

* * * * *